US010084819B1

United States Patent
Nogin et al.

(10) Patent No.: US 10,084,819 B1
(45) Date of Patent: Sep. 25, 2018

(54) SYSTEM FOR DETECTING SOURCE CODE SECURITY FLAWS THROUGH ANALYSIS OF CODE HISTORY

(71) Applicant: HRL Laboratories, LLC, Malibu, CA (US)

(72) Inventors: Aleksey Nogin, Fresno, CA (US); George Kuan, Westlake Village, CA (US); Alexei Kopylov, South Pasadena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 234 days.

(21) Appl. No.: 14/203,954

(22) Filed: Mar. 11, 2014

Related U.S. Application Data

(60) Provisional application No. 61/778,892, filed on Mar. 13, 2013.

(51) Int. Cl.
*H04L 29/06* (2006.01)
(52) U.S. Cl.
CPC .................... *H04L 63/20* (2013.01)
(58) Field of Classification Search
CPC . G06F 8/71; G06F 8/75; G06F 21/563; G06F 11/3624; G06F 11/3636; H04L 63/20
See application file for complete search history.

(56) References Cited

U.S. PATENT DOCUMENTS

| | | | | | |
|---|---|---|---|---|---|
| 5,929,864 | A * | 7/1999 | Picott | ................. | G06T 1/00 345/440 |
| 6,167,521 | A * | 12/2000 | Smith | ................. | G06F 21/33 380/286 |
| 6,539,367 | B1 * | 3/2003 | Blanksby | ............ | H03M 13/1102 706/14 |
| 8,479,188 | B2 * | 7/2013 | Singh | .................... | G06F 21/577 717/168 |
| 8,924,945 | B1 * | 12/2014 | Wright | .................... | G06F 8/433 717/132 |
| 2004/0177319 | A1 * | 9/2004 | Horn | ................... | G06F 17/3002 715/205 |

(Continued)

OTHER PUBLICATIONS

Sabelfeld et al., Declassification: Dimensions and Principles, Oct. 2009, Journal of Computer Security—18th IEEE Computer Security Foundations Symposium (CSF 18), vol. 17 Issue 5.*

(Continued)

*Primary Examiner* — Saleh Najjar
*Assistant Examiner* — Louis C Teng
(74) *Attorney, Agent, or Firm* — Tope-McKay & Associates

(57) ABSTRACT

The present invention relates to a system for detecting source code security flaws through analysis of code history. First, the system obtains a previously inferred information flow policy, the previously inferred informational flow policy being based on a previous source code revision. The system then determines changes in source code between a previous source code revision and a current source code revision. Finally, a current inferred information flow policy is generated by modifying the previously inferred information flow policy to reflect the changes in source code. If the changes in the source code do not comply with the previously inferred information flow policy, then the changes are reported to a developer.

16 Claims, 6 Drawing Sheets

(56) References Cited

U.S. PATENT DOCUMENTS

| | | | | |
|---|---|---|---|---|
| 2006/0130030 A1* | 6/2006 | Kwiat | ............... | G06F 9/4887 717/159 |
| 2008/0005357 A1* | 1/2008 | Malkhi | ............... | G06F 8/45 709/248 |
| 2010/0293529 A1* | 11/2010 | Austin | ............... | G06F 8/34 717/113 |
| 2012/0011493 A1* | 1/2012 | Singh | ............... | G06F 8/75 717/168 |
| 2012/0254842 A1* | 10/2012 | Henderson | ............ | G06F 8/24 717/136 |
| 2013/0074038 A1* | 3/2013 | Fox | ............... | G06F 8/70 717/122 |
| 2013/0305224 A1* | 11/2013 | Eade | ............... | G06F 8/20 717/126 |
| 2016/0062878 A1* | 3/2016 | Westrelin | ............ | G06F 9/4552 717/130 |
| 2016/0125304 A1* | 5/2016 | Pizurica | ............ | G06N 7/005 706/52 |

OTHER PUBLICATIONS

Ravi Chugh, Je_rey A. Meister, Ranjit Jhala, and Sorin Lerner. Staged information flow for JavaScript. In Michael Hind and Amer Diwan, editors, PLDI, pp. 50-62. ACM, 2009. ISBN 978-1-60558-392-1.

Andrey Chudnov and David A. Naumann Information flow monitor inlining. Computer Security Foundations Symposium, IEEE, 0:200-214, 2010. DOI: 10.1109/CSF.2010.21.

Albert Diserholt. Providing integrity policies as a library in Haskell. Master's thesis, Chalmers University of Technology, 2010.

M. D'Ambros, M. Lanza, and R. Robbes. An extensive comparison of bug prediction approaches. In Mining Software Repositories (MSR), 2010 7th IEEE Working Conference on, pp. 31-41, May 2010.

Dongseok Jang, Ranjit Jhala, Sorin Lerner, and Hovav Shacham. An empirical study of privacy-violating information flows in Javascript web applications. In Ehab Al-Shaer, Angelos D. Keromytis, and Vitaly Shmatikov, editors, ACM Conference on Computer and Communications Security, pp. 270-283. ACM, 2010. ISBN 975-1-4503-0245-6. DOI: 10.1145/1866307.1866339.

Peng Li and Steve Zdancewic. Encoding information flow in Haskell. In CSFW '06: Proceedings of the 19th IEEE workshop on Computer Security Foundations, p. 16, Washington, DC, USA, 2006. IEEE Computer Society. ISBN 0-7695-2615-2. DOI: 10.1109/CSFW.2006.13.

Gary McGraw. Software [in]security: Software security crosses the threshold. informIT, 2010.

Andrew C. Myers and Barbara Liskov. Protecting privacy using the decentralized label model. ACM Trans. Softw. Eng. Methodol., 9(4):410-442, 2000. ISSN 1049-331X. DOI: 10.1145/363516.363526. URL: http://www.cs.cornell.edu/andru/papers/iflow-tosem.pdf.

Jonas Magazinius, Alejandro Russo, and Andrei Sabelfeld. On-the-fly inlining of dynamic security monitors. In Kai Rannenberg, Vijay Varadharajan, and Christian Weber, editors, Security and Privacy—Silver Linings in the Cloud, vol. 330 of IFIP Advances in Information and Communication Technology, pp. 173-186. Springer Boston, 2010. DOI: 10.1007/978-3-642-15257-3_16.

Andrew C. Myers, JFlow practical mostly-static information flow control. In POPL '99: Proceedings of the 26th ACM SIGPLAN-SIGACT symposium on Principles of programming languges, pp. 228-241. ACM, 1999. ISBN 1-58113-095-3. DOI: 10.1145/292540.292561. URL: http://www.cs.cornell.edu/andru/papers/popl99/popl99.pdf.

James Newsome and Dawn Xiaodong Song. Dynamic taint analysis for automatic detection, analysis, and signature generation of exploits on commodity software. In NDSS. The Internet Society, 2005. ISBN 1-691562-20-7, 1-891562-19-3. URL: http://www.isoc.org/isoc/conferences/ndss/05/proceedings/papers/taintcheck.pdf.

Peter Orbaek. Can you trust your data? In Peter D. Mosses, Mogens Nielsen, and Michael I. Schwartzbach, editors, TAPSOFT, vol. 915 of Lecture Notes in Computer Science, pp. 575-589. Springer, 1995. ISBN 3-540-59293-8. DOI: 10.1007/3-540-59293-8_221.

Fran_cois Pottier and Vincent Simonet. Information flow inference for ML. In POPL '02: Proceedings of the 29th ACM SIGPLAN SIGACT symposium on Principles of programming languages, pp. 319-330, New York, NY, USA, 2002, ACM. ISBN 1-58113-450-9. DOI: 10.1145/503272.503302. URL: http://cristal.inria.fr/~simonet/publis/fpottier-simonet-toplas.pdf.

Alejandro Russo, Koen Claessen, and John Hughes. A library for light-weight information-flow security in Haskell. In Haskell '08: Proceedings of the first ACM SIGPLAN symposium on Haskell, pp. 13-24, New York, NY, USA, 2008. ACM. ISBN 978-1-60558-064-7. DOI: 10.1145/1411286.1411289.

Vincent Simonet and Inria Rocquencourt Flow Caml in a nutshell. In Proceedings of the first APPSEM-II Workshop, pp. 152-165, 2003.

Dachuan Yu, Ajay Chander, Nayeem Islam, and Igor Serikov, Javascript instrumentation for browser security. In Proceedings of the 34th annual ACM SIGPLAN-SIGACT symposium on Principles of programming languages, POPL '07, pp. 237-249, New York, NY, USA, 2007. ACM. ISBN 1-59593-575-4. DOI: 10.1145/1190216.1190252.

Shahed Zaman, Bram Adams, and Ahmed E. Hassan. Security versus performance bugs: a case study on firefox. In Arie van Deursen, Tao Xie, and Thomas Zimmermann, editors, MSR, pp. 93-102. IEEE, 2011. ISBN 978-1-4503-0574-7.

Gartner. Gartner says security software market is poised for 11 percent growth in 2010, Gartner Press Release, 2010.

Nevin Heintze and Jon G. Riecke, The SLam calculus: programming with secrecy and integrity. In Proceedings of the 25th ACM SIGPLAN-SIGACT symposium on Principles of programming languages, POPL '98, pp. 365-377, New York, NY, USA, 1998. ACM. ISBN 0-89791-979-3. DOI: 10.1145/268946.268976.

\* cited by examiner

SYSTEM FOR DETECTING SOURCE CODE SECURITY FLAWS THROUGH ANALYSIS OF CODE HISTORY

CROSS-REFERENCE TO RELATED APPLICATIONS

This is a Non-Provisional Utility Application of U.S. Provisional Application No. 61/778,892, filed on Mar. 13, 2013, entitled, "Detecting Source Code Security Flaws through Analysis of Code History."

BACKGROUND OF THE INVENTION (1) Field of Invention

The present invention relates to a security system and, more particularly, to a system for detecting source code security flaws through analysis of code history.

(2) Description of Related Art

Secure information flow is an important foundation to most security and computer systems. As static analysis for security becomes standard in the systems development process, it becomes paramount that tools be tailored to the security demands in any product line that interfaces with third-party software.

In information flow security, prior art falls into three general categories: dynamic taint analysis (see, for example, the List of Cited Literature References, Literature Reference Nos. 2, 7, 11, 13, and 18), secure information flow compilers (see Literature Reference Nos. 6, 12, 14, 15, and 17), and information flow security libraries for general-purpose programming languages (see Literature Reference Nos. 3, 8, and 16). While the aforementioned prior art does provide some level of security, none of those approaches incorporate any kind of code history analysis. As a result, such approaches require software developers to manually write the security policy, which significantly increases the code development cost.

The prior art also includes software repository data mining techniques (see Literature Reference No. 19) focused on analyzing textual comments, bug database information for security-related changes, and coarse-grain criteria such as the number of lines of code changed, not the content of the source code itself. Such techniques are disadvantageous because they are based upon ancillary and may not necessarily reflect the structure and content of the program itself As another example, Chugh et al. (see Literature Reference No. 1) developed a system for staged analysis of information flow for JavaScript. This system checks the information flow of incomplete programs. When JavaScript code is dynamically loaded, it is checked. Software projects usually consist of multiple interdependent files. The staged analysis approach enables information analysis at the per file level. Since the source in the code repository is not guaranteed to compile or to be complete, code history must account for incomplete source such as a revision with a missing file or an incomplete file. However, a code history-based approach (according to the principles of the present invention) goes beyond the staged analysis approach in that it can handle changes to the information flow policy as opposed to attempting to maintain a single monolithic policy.

Most techniques for exploiting software repository information focus on statistical techniques such as using code churn (number of added and deleted lines of code) or metrics (keywords in comments) to predict bugs (see Literature Reference No. 4). The main shortcoming of these techniques is that they do not account for the actual characteristics of the bugs in question. In contrast, code history-based analysis (as described in further detail below) can pinpoint bugs and the information flow implications of such bugs.

Thus, a continuing need exists for a code history-based approach to detect source code security flaws.

SUMMARY OF INVENTION

The present invention relates to a security system and, more particularly, to a system for detecting source code security flaws through analysis of code history. The system, for example, includes one or more processors and a memory. The memory is a non-transitory computer-readable medium having executable instructions encoded thereon, such that upon execution of the instructions, the one or more processors performs several operations, such as obtaining or re-inferring information flow policy based on an earlier source code revision, the obtained or re-inferred information flow policy being a first information flow policy (e.g., previously inferred information flow policy); determining changes in source code between the earlier source code revision and a current source code revision; and generating a current inferred information flow policy by modifying the first flow policy to reflect the changes in source code.

In another aspect, each information flow policy includes a dependency graph which is a directed graph with nodes representing variables and directed edges representing information flow between the nodes. Further, each variable in the information flow policy includes an associated security label designating a security level, with the security labels collectively forming a security lattice such that any pair of elements has a least upper bound and a greatest lower bound.

In yet another aspect, each information flow policy includes declassification points, the declassification points specifying where information may flow freely between security levels. Each information flow policy includes declassification conditions, the declassification conditions specifying conditions upon which a person is allowed to alter the declassification points.

In another aspect, the system performs operations of:
a. determining if the changes in source code satisfy the information flow policy that was based on the earlier source code revision;
  i. if yes, then reporting that the first information flow policy is satisfied, then stopping; or
  ii. if no, adding a declassification point to the first information flow policy, then
b. determining if the changes in source code satisfy the first information flow policy;
  i. if yes, then reporting that the first information flow policy is satisfied, then stopping; or
  ii. if no, adding a declassification point to the first information flow policy, then
c. relabeling the dependency graph; and
d. reporting the changes in the source code.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention conjunction with reference to the following drawings, where.

DETAILED DESCRIPTION

Figure 1:
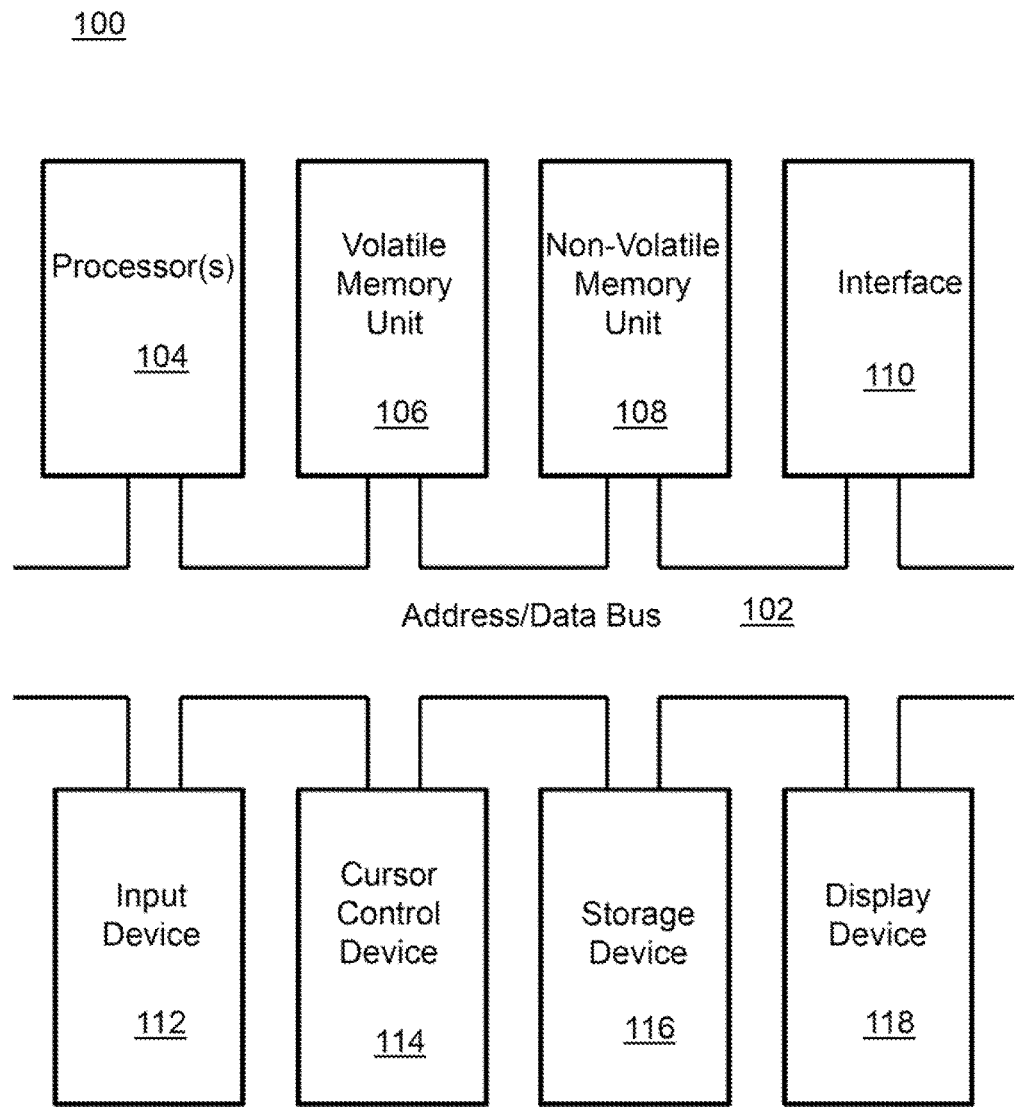
FIG. 1 is a block diagram depicting the components of a system according to the principles of the present invention.

The present invention relates to a security system and, more particularly, to a system for detecting source code security flaws through analysis of code history. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references is provided. Next, a description of various principal aspects of the present invention is provided. Subsequently, an introduction provides the reader with a general understanding of the present invention. Thereafter, details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Ravi Chugh, Jeffrey A. Meister, Ranjit Jhala, and Soria Lerner. Staged information flow for JavaScript. In Michael Hind and Amer Diwan, editors, *PLDI*, pages 50-62. ACM, 2009.
2. Andrey Chudnov and David A. Naumann. Information flow monitor inclining. *Computer Security Foundations Symposium, IEEE,* 0:200-214, 2010.
3. Albert Diserholt. Providing integrity policies as a library in Haskell. Master's thesis, Chalmers University of Technology, 2010.
4. M. D'Ambros, M. Lanza, and R. Robbes. An extensive comparison of bug prediction approaches. In *Mining Software Repositories (MSR),* 2010 *7th IEEE Working Conference on,* pages 31-41, May 2010.
5. Gartner. Gartner says security software market is poised. for 11 percent growth in 2010. Gartner Press Release, 2010.
6. Nevin Heintze and Jon G. Riecke. The SLam calculus: programming with secrecy and integrity. In *Proceedings of the 25th ACM SIGPLAN-SIGACT symposium on Principles of programming languages,* POPL '98, pages 365-377, New York, N.Y., USA, 1998. ACM. ISBN 0-89791-979-3. 10.1145/268946.268976.
7. Dongseok Jang, Ranjit Jhala, Sorin Lerner, and Hovav Shacham. An empirical study of privacy-violating information flows in Javascript web applications. In Ehab Al-Shaer, Angelos D. Keromytis, and Vitaly Shmatikov, editors, *ACM Conference on Computer and Communications Security,* pages 270-283. ACM, 2010.
8. Peng Li and Steve Zdancewic. Encoding information flow in Haskell. In *CSFW '06:Proceedings of the 19th IEEE workshop on Computer Security Foundations,* page 16, Washington, D.C., USA, 2006.
9. Gary McGraw. Software [in]security: Software security crosses the threshold. *informIT,* 2010.
10. Andrew C. Myers and Barbara Liskov. Protecting privacy using the decentralized label model. ACM Trans. Softw. Eng. Methodol., 9(4):410-442, 2000.
11. Jonas Magazinius, Alejandro Russo, and Andrei Sabelfield. On-the-fly inlining of dynamic security monitors. In Kai Rannenberg, Vijay Varadharajan, and Christian Weber, editors, *Security and Privacy—Silver Linings in the Cloud,* volume 330 of *IFIP Advances in Information and Communication Technology,* pages 173-186. Springer Boston, 2010.
12. Andrew C. Myers. JFlow: practical mostly-static information flow control. In *POPL '99:Proceedings of the 26th ACM SIGPLAN-SIGACT symposium on Principles of programming languages,* pages 228-241. ACM, 1999.
13. James Newsome and Dawn Xiaodong Song. Dynamic taint analysis for automatic detection, analysis, and signature generation of exploits on commodity software. In *NDSS.* The Internet Society, 2005.

14. Peter Ørbæk. Can you trust your data? In Peter D. Mosses, Mogens Nielsen and Michael I. Schwartzbach, editors, *TAPSOFT*, volume 915 of *Lecture Notes in Computer Science*, pages 575-589. Springer, 1995.

15. François Pottier and Vincent Simonet. Information flow inference for ML. In *POPL '02:Proceedings of the 29th ACM SIGPLAN-SIGACT symposium on Principles of programming languages*, pages 319-330, New York, N.Y., USA, 2002.

16. Alejandro Russo, Koen Claessen, and John Hughes. A library for light-weight information-flow security in Haskell. In *Haskell '08:Proceedings of the first ACM SIGPLAN symposium on Haskell*, pages 13-24, New York, N.Y., USA, 2008.

17. Vincent Simonet and Inria Rocquencourt. Flow Caml in a nutshell. In *Proceedings of the first APPSEM-II workshop*, pages 152-165, 2003.

18. Dachuan Yu, Ajay Chander, Nayeem Islam, and Igor Serikov. Javascript instrumentation for browser security. In *Proceedings of the 34th annual ACM SIGPLAN-SIGACT symposium on Principles of programming languages*, POPL '07, paws 237-249, New York, N.Y., USA, 2007.

19. Shahed Zaman, Bram Adams, and Ahmed E. Hassan. Security versus performance bugs: a case study on firefox. In Arie van Deursen, Tao Xie, and Thomas Zimmermann, editors, *MSR*, pages 93-102. IEEE, 2011.

(2) Principal Aspects

The present invention has three "principal" aspects. The first is a system for detecting source code security flaws. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 1 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. in accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
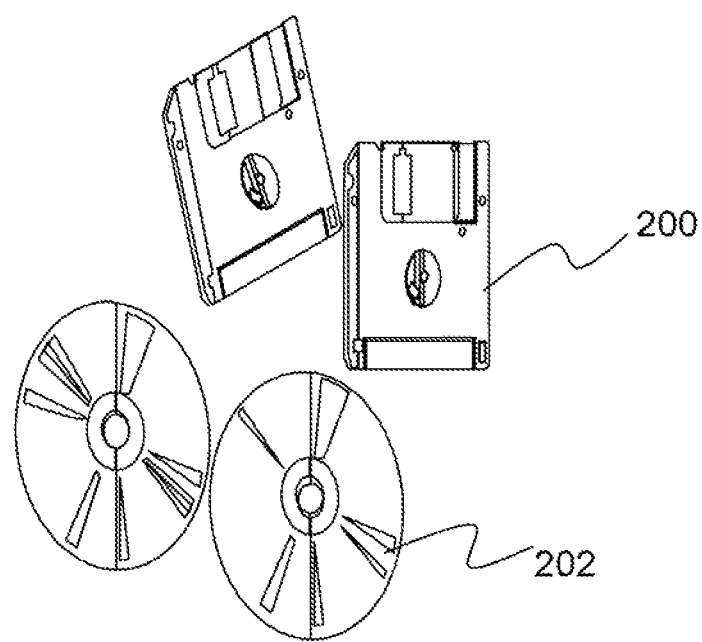
FIG. 2 is an illustration of a computer program product embodying an aspect according to the principles of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored on any non-transitory computer-readable medium, such as in the memory of a computer, or on a floppy disk, a CD-ROM, and a flash drive. In either event, the instructions are encoded on a non-transitory computer-readable medium.

(3) Introduction

Secure and robust operation of software is critical for modern software systems. Of the security vulnerabilities and bugs introduced during development time, many result from mismatches between tacit assumptions and design decisions made by different developers, or even by the same developer at different times. Code history-driven information flow security analysis ("history-based analysis") is a unique technique for analyzing past revisions of software in order to automatically discover these implicit assumptions and decisions, uncovering mismatches and inconsistencies and flagging potential security vulnerabilities which could have resulted from such mismatches and inconsistencies. History-based analysis may be used to provide early detection of potential security vulnerabilities, better feedback for developers, and improved software security. These techniques are complementary to formal verification: while verification helps to verify that code satisfies a certain policy, this technique captures such a policy.

During the software development process, software developers are constrained not only by explicitly codified specifications, but also by implicit specifications imposed by past assumptions and design decisions spread throughout the code base. Unintentionally deviating from a specification, whether explicit or implicit, is a common source of software errors. The present invention automatically uncovers some of the implicit specifications in order to detect any deviations from these implicit specifications that exist in the code.

Most large software systems are developed with the aid of a Version Control System (VCS) and an Integrated Development Environment (IDE). Examples of VCS include Subversion, GIT, ClearCase, and Perforce. Subversion is produced by the Apache Software Foundation, located at 1901 Munsey Drive, Forest Hill Md. 21050, United States, while GIT is a free and open source distributed version control system. ClearCase is produced by the Rational Software division of IBM, located at 1 New Orchard Road, Armonk, N.Y. 10504-1722, United States. Perforce produced by Perforce Software, Inc., located at 2320 Blanding Avenue, Alameda, Calif. 94501, United States. Examples of an IDE include Eclipse by the Eclipse Foundation, located at 102 Centrepointe Drive, Ottawa, Ontario, Canada, K2G 6B1.

Both of these common tools (the VCS and IDE) can provide information about the code history. For example, VCSs provide ready access to code revision history and IDEs can capture code editing history up to the level of single key strokes. The history of code changes captures implicit design decisions and gives insight into the evolution of the implicit program specifications. This assumption is especially true for large, mature software projects, where core functionality well defined and largely invariant from revision to revision, a fact that is attested by the widespread adoption of regression test systems.

One important type of software specification in the area of cyber security is information flow policy. Complex semantic properties such as information flow cannot typically be detected by regression tests. When developers extend or revise an existing program, they may introduce bugs by writing code that is inconsistent with the existing information flow policy, i.e., by adding code that introduces an illegal flow. The new code may be inconsistent with a developer's own previous policy or another developer's policy. Consider for example the following simple scenario. A program has two modules: A and B. Suppose there is no information flow from module A to B in revision 1 under the version control repository. In revision 2, a flow from A to B is added. This is a big change to the design and to the information flow policy. This revision should be flagged so that developers can confirm whether the information flow implication of the revision is intentional. In other words, the system according to various embodiments of the present disclosure can operate by determining if an information flow policy has changed from an earlier information flow policy, and if so, then determining changes in source code between an earlier source code revision and a current source code revision. History-based analysis primarily provides for the precise identification of vulnerabilities introduced due to deviations from earlier potentially forgotten design decisions. However, similar techniques may also be used for capturing malicious attempts to change the code to break an information flow policy.

By incorporating development history into code validation, the approach makes it possible to discover inconsistencies in security assumptions; both the inconsistencies between the assumptions made by different developers and the inconsistencies between the assumptions made by the same developer at different stages of the code development process. By uncovering and capturing the implicit security assumptions and decisions against in the development process and then checking the subsequent code changes against those assumptions, the approach makes it possible to reveal subtle security flaws that would not have been apparent from only analyzing the latest revision of the code.

Thus, described below is a system for analyzing computer source code for security flaws by utilizing code development history information (e.g., the code revision history retrieved tom a source code version control system and the code editing history collected in an integrated development environments). The system utilizes code development history to uncover developer' implicit security assumptions and past security decisions, and synthesizes a security policy that the source code is then checked against and which is also used to detect later violations of an implicit security policy. The history-based analysis may be embodied in several forms, non-limiting examples of which include: (1) Inference of security properties and security vulnerability detection using version control code history; and (2) An efficient incremental analysis of code fragments (i.e., changes in code) in a form of an IDE plugin capable of online analysis of source files as they are being edited in the IDE.

(4) Specific Aspects of the Invention

Figure 3:
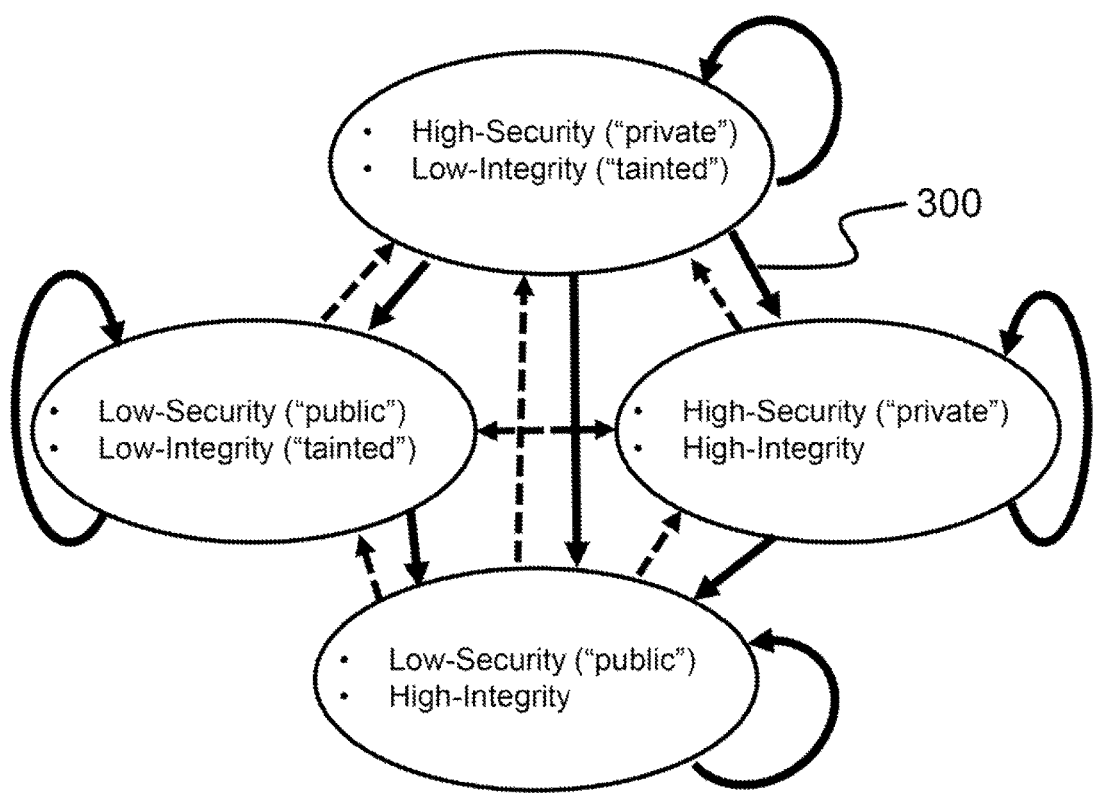
FIG. 3 is a flow chart illustrating a simple security level lattice.

History-based analysis infers the security properties of the code by focusing on inferring the implied information flow policy. Typically, an information flow policy has the following three components:

1. Security label configuration: Each program variable has an associated security label on the data privacy and/or integrity levels. A security label configuration is a mapping from a program variable to the security label For example and as shown in FIG. 3, one may label all data as private/public and low/high integrity. Another example is a set of security labels that specifies who allowed to receive or influence a piece of information, as used in the Decentralized Label Model (see Literature Reference No. 10). Together, security labels of a program form a security lattice (i.e., a partially ordered set (L, ≤) such that any pair of elements has a least upper bound (join) and a greatest lower bound (meet)).

2. Declassification points. Information may flow freely inside one security level of from one security level to a less restrictive level (e.g., the solid arrows 300 in FIG. 3). However, sometimes information needs to be declassified (i.e., moving from a private level to a public one) or endorsed (i.e., moving from a low integrity level to a high integrity one). The information flow policy must specify the points where this behavior is allowed. Given a configuration for a program source, one can calculate a security level for each program expression (an implicit security label corresponding to the join of the security levels for each of its components).

3. Declassification conditions. An information flow policy should also specify who is allowed to declassify what and under which conditions (e.g., alter the declassification points).

Figure 4:
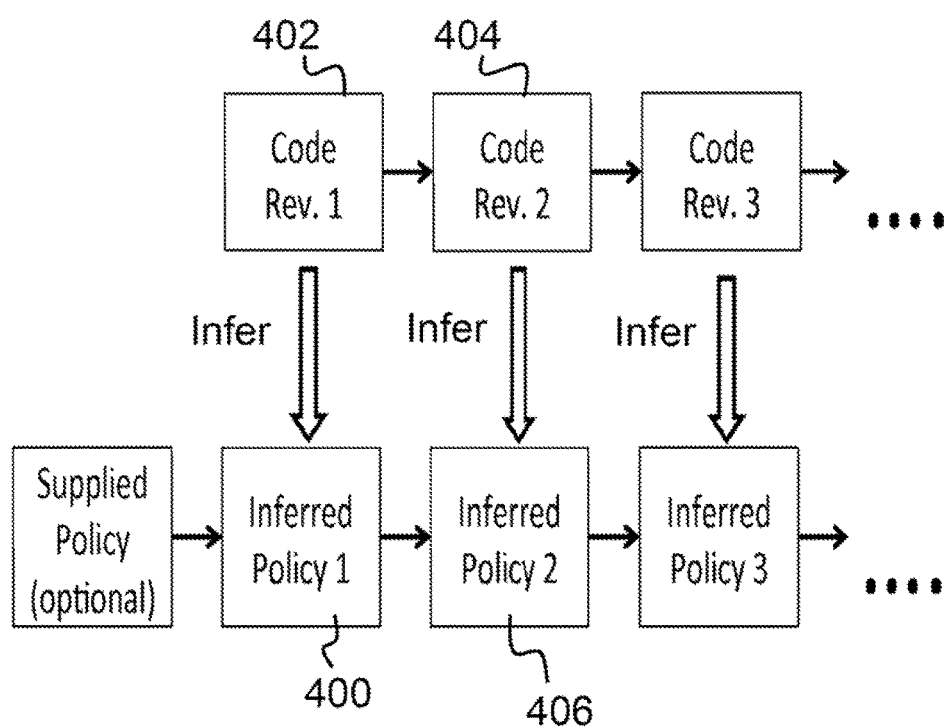
FIG. 4 is a flow chart illustrating code repository history.

Information flow policies may be supplied by the developer or may be automatically inferred through static code analysis. Since multiple policies may match a given program, a heuristic is needed to guide the inference. In the case when the history of the code is known, one can use a previously inferred policy as a guide far constructing the new one, corresponding to the new revision. As shown FIG. 4, instead of constructing a policy from scratch, the code history-based analysis uses the previously inferred policy 400 from a recent revision 402 as a starting point. In other words, the system obtains or re-infers information flow policy based on an earlier source code revision. Thereafter, the system proceeds to analyze only the changes in the most recent revision 404 in order to obtain a new, complete inferred policy 406 addressing these changes. This results in an online incremental information flow analysis as shown in FIG. 4.

The previously inferred policy (e.g., 400) can provide a large number of heuristical inputs, such as the security labeling on input/output (I/O) channels and variables, the location of declassification points, and so on. These inputs should be preserved as much as possible on those sections of the code that were not changed in the current revision. When a code revision results in any inconsistency with the previously inferred policy, it could be an indication of either an introduction of a security bug, a conscious decision to change the security model (which could still be introducing a bug if not done consistently), or an error in a previously inferred policy.

In one aspect according to the principles of the present invention, all such inconsistencies should be flagged as potential security errors, based in part on the following assumptions:

1. Information flow policies of correct code usually remain consistent (i.e., one does not commonly reverse information flow from revision to revision of code);
2. Security bugs tend to introduce information flow changes. This technique can be fine-tuned by applying supervised machine learning techniques to better capture the relationships between subsequent information flow policies and fine-tuning hat constitutes an "inconsistency" that needs to be reported as a potential bug. A non-limiting example of such a supervised learning technique is an analysis of a database of a previously found inconsistency with the user provided output: whether that inconsistency was an actual bug versus a false alarm.
3. Policies associated with earlier revisions are "more trustworthy".

In another aspect, the inconsistencies to be flagged can be further narrowed, for example, by employing heuristics and/or taking user guidance into account. In latter case, the user guidance may be, for example, in the form of additional annotations on code or additional information entered into the VCS.

Figure 5:
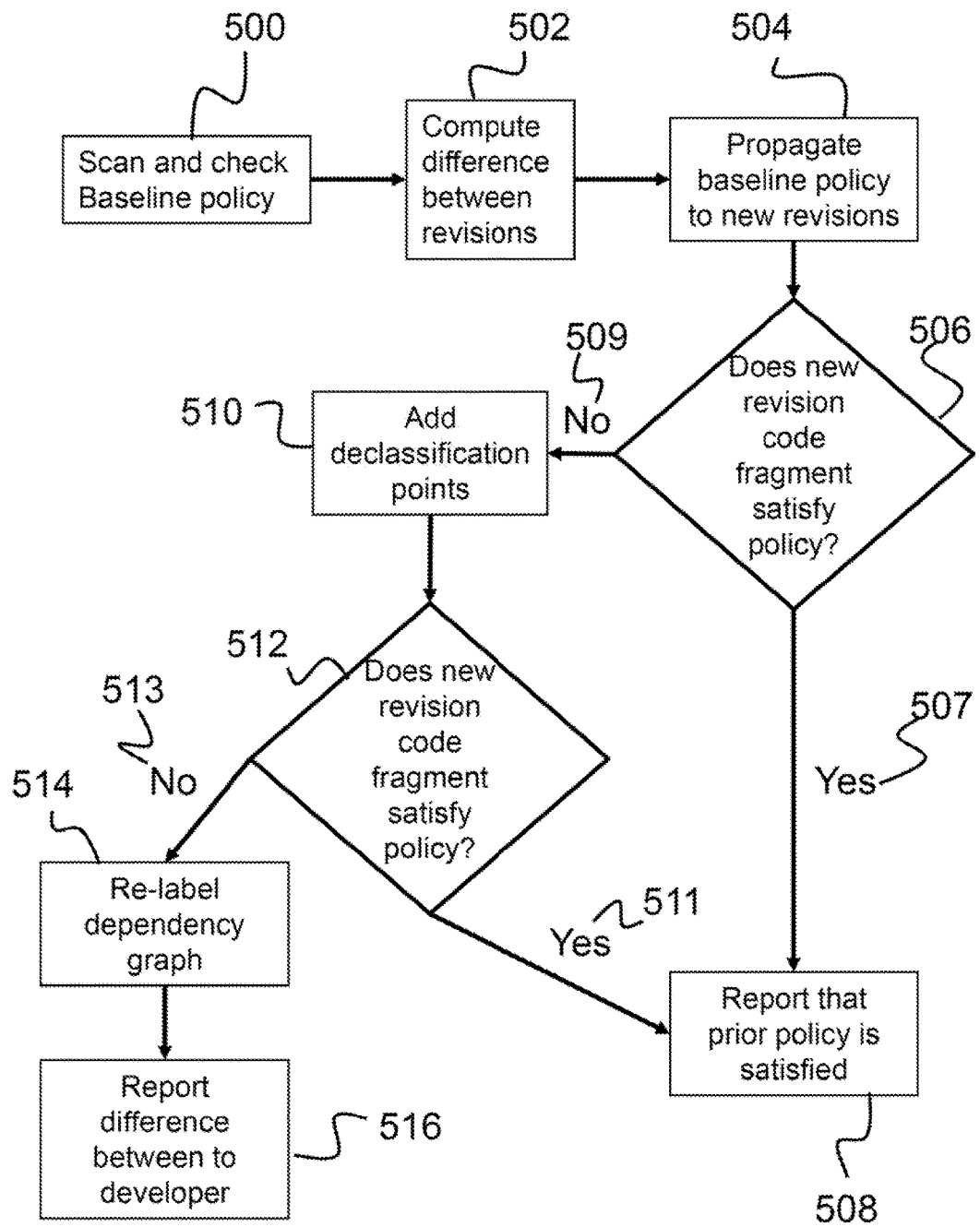
FIG. 5 is a flow chart illustrating a code history analysis process.

FIG. 5 provides an outline of the process for code history-based security analysis according to the principles of the present invention. The key is to calculate composable policies for code fragments (changes in code). The system begins by reconciling 500 the baseline revision and policy. The reconciliation process is further described below with respect to FIG. 6. The baseline revision must satisfy the baseline policy in order for any further analysis to proceed. A non-limiting example of satisfying the baseline policy is a program without flow from high to low security variables, whereas a non-limiting example of not satisfying the baseline policy is a program that does have a flow from high to low security variables. If baseline revision does not satisfy the baseline policy, then the repository's policy record must have been corrupted, in which case one would need to reinitialize by creating a new initial baseline policy.

The next step is to calculate the difference 502 between the baseline and target revisions. The difference constitutes the change set. The difference 502 is calculated by, for example, the number of changes in the source code. It should be noted that the baseline policy may or may not be different than the previously inferred policy. The baseline policy is provided by the user, who can take the inferred policy as a baseline policy, or may change it. But for purpose of this technique it is not important where the baseline policy comes from.

The third step is of paramount importance. The system takes the policy from the prior revision and attempts to propagate 504 this policy as far as possible in the target revision. Typically, the analysis can simply proceed using the policy as an initial seed from which to analyze the rest of the source code. The subject of analysis should be the difference in the target revision (versus the baseline). When this propagation process runs into a region in the source code where standard information flow checking fails, the algorithm reaches a decision point. For example, it must be determined 506 if the new revision code fragment satisfies the existing policy. The answer "yes" 507, in that the new revision code fragment does satisfy existing policy when, for example, any flow from high to low security policy is done through appropriate declassification. In such a circumstance, it can then be reported 508 to the developer or user that the prior policy is satisfied.

Alternatively, checking may fail (i.e., "no" 509) when the analysis reaches a new or changed expression or statement that does not satisfy the natural extension of the baseline policy. For example, in a baseline program a:=b;c:=b with a baseline policy a→High,b→Low,c→Low (which means that a is a High secret variable and b and c are Low secret variables), adding a statement c:=a to the end of the program in a new revision would contradict the established baseline policy. In order to reconcile the target with the baseline policy, the algorithm can first attempt to add 510 a declassification point. A non-limiting example of a declassification point is through comparison of a password and password attempt; it can be compared with any string which returns a determination to a low security channel whether or not the password is correct. This change in policy must be noted in the new policy corresponding to the target revision.

After the declassification point is added 510, it is again determined 512 if the new revision code fragment satisfies the existing policy (which is reflective of the change in policy as provided for by the declassification point). If adding the declassification point succeeds (i.e., "yes" 511), then it can be reported 508 that the prior policy is satisfied.

Alternatively, if merely adding a declassification point fails (i.e., "no" 513), it may be necessary to re-label 514 the dependency graph, at which point the algorithm must report 516 the difference between the labelings to the developer as it amounts to a major departure from the prior policy.

The main artifact of interest to be extracted from program source code is the dependency graph for variables/names, which is a directed graph where the nodes represent variables and directed edges represent information flow. For example, $(x_0, x_1)$ denotes the observation that information from $x_0$ can flow to $x_1$ (typically due to assignment, an explicit flow, or an indirect flow due to paths not taken under a conditional branch, an implicit flow). An instance of information flow policy is an assignment of security labels (elements of a security lattice) to each node in the dependency graph such that for all edges $(x_0, x_1)$, label$(x_0)$≤label$(x_1)$. Furthermore, certain edges can be labeled as "declassification" edges. Such edges need not satisfy label$(x_0)$ ≤label$(x_1)$.

Figure 6:
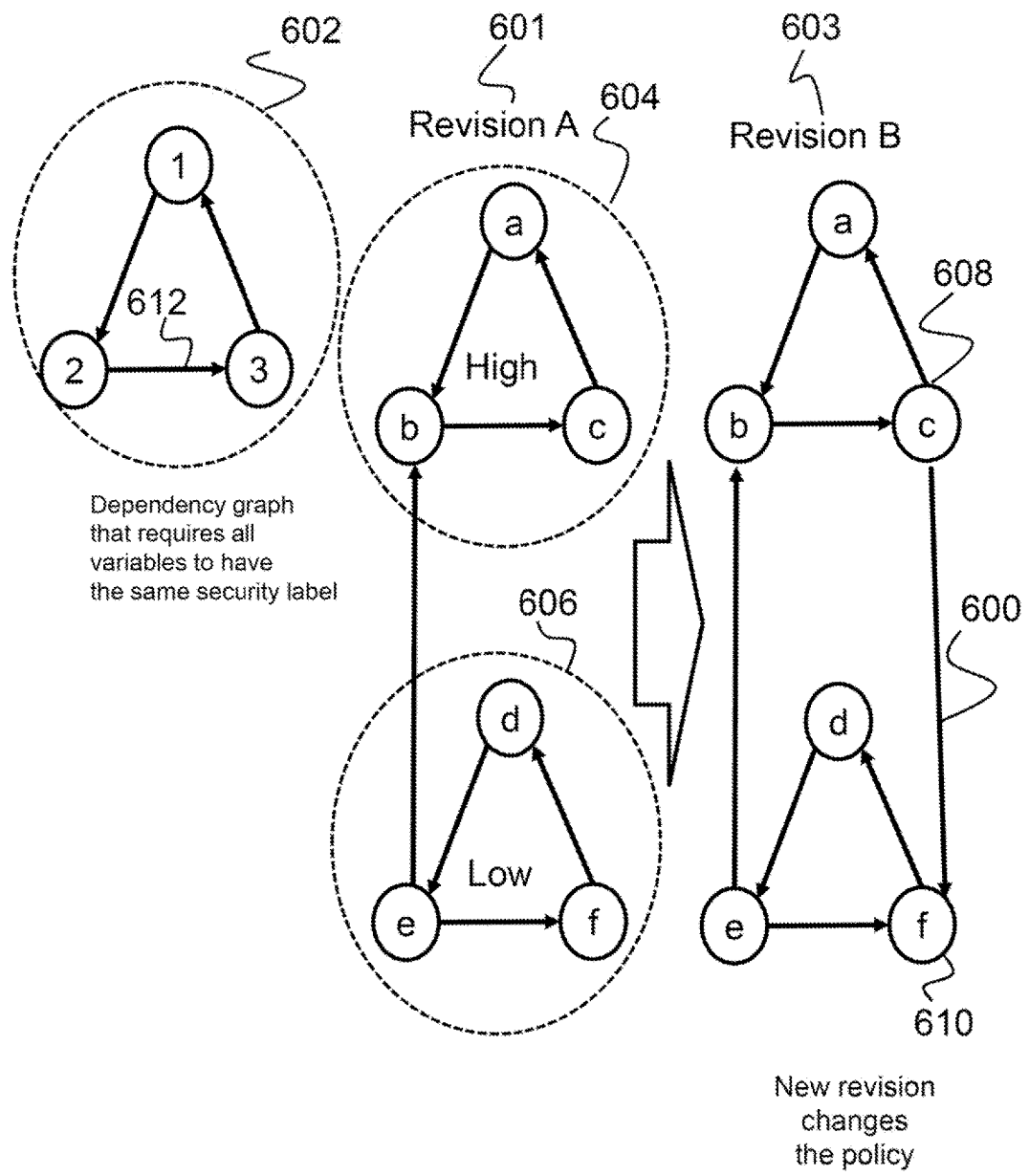
FIG. 6 is an example of a dependency graph and the dependency graph evolution's effect on policy.

For example, FIG. 6 provides an illustration of dependency graphs and policies. When source code is revised, the dependency graph may change. Such changes may invalidate prior policies. In the example as provided for in FIG. 6, adding the new edge (c,f) 600 to the dependency graph invalidates the policy 602, in this example, that requires all variables to have the same security label, such as a,b, c→High 604 and d,e,f→Low 606. The system may attempt to reconcile the policies induced by revision. A 601 and revision B 603 in at least two ways. The new edge (c,f) 600 can be identified as a declassification edge. This is the simplest solution. Alternatively, the system can assign revision B 603 a new policy a,b,c,d,e,f→Low. This latter solution is less likely and therefore such an occurrence should be reported to the developer in order to confirm such a dramatic departure from the original policy of revision A 601.

In general, changes to a dependency graph may be either an addition (adding nodes and edges) or a subtraction (removing nodes and edges). As shown in the example in FIG. 6, an addition can introduce a potential security vulnerability. Adding an edge between c 608 and f 610 in revision B 603 fundamentally changes the policy 602. Such a change permits information flow in the direction opposite of what the policy 602 in revision A 601 requires. By attempting to propagate the policy from an earlier revision, history-based analysis can help identify suspicious departures from established policies. However, it is unlikely that a software project only grows monotonically (i.e., never removing functionality and source code elements). Changes that remove nodes and edges may also admit a change to a policy. For example, a removal of edge (2,3) 612 from FIG. 6 makes the policy 3→Low, 1→Medium, and 2→High admissible where it previously was not. Despite this fact, a reasonable rule is to retain the previous policy (3,2,1→Low) unless the new revision explicitly identifies these new security label assignments. The rule-of-thumb is to minimize the amount of change in the policy from revision-to-revision. This should not be confused with additions of policy. When a program is expanded in a new revision, it is perfectly reasonable to expect that such a revision would introduce a set of new variables and flows between them without contradicting any part of the policy from the prior revision. Thus, arbitrarily complicated extensions of policy ought not to raise any suspicion by themselves.

In general, policy changes only apply in a single direction. For example, in FIG. 6, labeling the edge (c,f) 600 is a possible policy change to reconcile revisions A 601 and B 603. However, the reverse of that policy change does not in general reconcile revision B 603 to A 601. This is because one may be starting with a completely different policy with revision B 603 such as one in which all nodes are assigned security level Low. In that case, unlabeling edge (c,f) 600 will not reconcile a source change in the reverse direction.

One common use case of VCS is the merging of branches. Most VCSs are intended to facilitate team collaboration on a single source code repository. Branches permit team members to fork off a parallel development of a repository in order to work on experimental features without affecting the main repository (the trunk) until those features are ready. When starting a new branch of parallel development, the policy that applies to the source code version that served as the origin for the branch, should be adopted as the baseline policy for the new branch. Merging of branches entails the merging of policies. In that case, this approach still applies because revision numbers span branches. The earlier branch revision would serve as a starting point and provide the baseline policy. This approach can be refined by giving certain branches priority based on the role of the committer doing the branching. For example, commits of senior software engineers may have a higher priority than commits of junior engineers. Also, priority may be given depending on the role of the commit. For example, a minor, refraction or bug-fixing commit may have a lower priority with respect to a commit that adds a feature, since the latter type of commits tends to introduce new genuine information flow, while the former commits are supposed to refrain from introducing new information flow.

In summary and as noted above, the present invention is directed to a system, computer program product, and method for detecting source code security flaws through analysis of code history. Code history-driven information flow security analysis is a unique technique for analyzing past revisions of software in order to automatically discover mismatches between tacit assumptions and design decisions made by different developers, or even by the same developer at different times. This allows the system to uncover mismatches and inconsistencies and flag potential security vulnerabilities which could have resulted from such mismatches and inconsistencies. History-based analysis can be used to provide early detection of potential security vulnerabilities, better feedback for developers, and improved software security.

What is claimed is:

1. A computer implemented method for detecting source code security flaws through analysis of code history, the method comprising an act of causing one or more processors to execute instructions encoded on a non-transitory computer-readable medium, such that upon execution of the instructions, the one or more processors perform operations of:
   obtaining or re-inferring information flow policy based on an earlier source code revision, the obtained or re-inferred information flow policy being a first information flow policy;
   determining if the first information flow policy has changed from an earlier information flow policy, and if so, then determining changes in source code between the earlier source code revision and a current source code revision;
   propagating the first information flow policy in the current source code revision;
   generating a current inferred information flow policy by modifying the first information flow policy to reflect the changes in source code; and
   wherein each information flow policy includes a dependency graph which is a directed graph with nodes representing variables and directed edges representing information flow between the nodes.

2. The computer implemented method as set forth in claim 1, wherein each variable in the information flow policy includes an associated security label designating a security level, with the security labels collectively forming a security lattice such that any pair of elements has a least upper bound and a greatest lower bound.

3. The computer implemented method as set forth in claim 2, wherein each information flow policy includes declassification points, the declassification points specifying where information may flow freely between security levels.

4. The computer implemented method as set forth in claim 3, wherein each information flow policy includes declassification conditions, the declassification conditions specifying conditions upon which a person is allowed to alter the declassification points.

5. The computer implemented method as set forth in claim 4, further comprising operations of:
   a. determining if the changes in source code satisfy the information flow policy that was based on the earlier source code revision;
      i. if yes, then reporting that the first information flow policy is satisfied, then stopping; or
      ii. if no, adding a declassification point to the first information flow policy, then
   b. determining if the changes in source code satisfy the first information flow policy as modified by the declassification point;
      i. if yes, then reporting that the first information flow policy is satisfied, then stopping; or
      ii. if no, then
   c. relabeling the dependency graph; and
   d. reporting the changes in the source code to a developer.

6. A computer program product for detecting source code security flaws through analysis of code history, the computer program product comprising:
   a non-transitory computer-readable medium having executable instructions encoded thereon, such that upon execution of the instructions by one or more processors, the one or more processors perform operations of:
   obtaining or re-inferring information flow policy based on an earlier source code revision, the obtained or re-inferred information flow policy being a first information flow policy;
   determining if the first information flow policy has changed from an earlier information flow policy, and if so, then determining changes in source code between the earlier source code revision and a current source code revision;
   propagating the first information flow policy in the current source code revision;
   generating a current inferred information flow policy by modifying the first information flow policy to reflect the changes in source code; and
   wherein each information flow policy includes a dependency graph which is a directed graph with nodes representing variables and directed edges representing information flow between the nodes.

7. The computer program product as set forth in claim 6, wherein each variable in the information flow policy includes an associated security label designating a security level, with the security labels collectively forming a security lattice such that any pair of elements has a least upper bound and a greatest lower bound.

8. The computer program product as set forth in claim 7, wherein each information flow policy includes declassification points, the declassification points specifying where information may flow freely between security levels.

9. The computer program product as set forth in claim 8, wherein each information flow policy includes declassification conditions, the declassification conditions specifying conditions upon which a person is allowed to alter the declassification points.

10. The computer program product as set forth in claim 9, further comprising executable instructions encoded thereon, such that upon execution of the instructions by one or more processors, the one or more processors perform operations of:
   a. determining if the changes in source code satisfy the information flow policy that was based on the earlier source code revision;
      i. if yes, then reporting that the first information flow policy is satisfied, then stopping; or
      ii. if no, adding a declassification point to the first information flow policy, then b. determining if the changes in source code satisfy the first information flow policy as modified by the declassification point;
   i. if yes, then reporting that the first information flow policy is satisfied, then stopping; or
   ii. if no, then
c. relabeling the dependency graph; and
d. reporting the changes in the source code to a developer.

11. A system for detecting source code security flaws through analysis of code history, the system comprising:
one or more processors and a memory, the memory being a non-transitory computer-readable medium having executable instructions encoded thereon, such that upon execution of the instructions, the one or more processors perform operations of:
obtaining or re-inferring information flow policy based on an earlier source code revision, the obtained or re-inferred information flow policy being a first information flow policy;
determining if the first information flow policy has changed from an earlier information flow and if so, then determining changes in source code between the earlier source code revision and a current source code revision;
propagating the first information flow policy in the current source code revision;
generating a current inferred information flow policy by modifying the first information flow policy to reflect the changes in source code; and
wherein each information flow policy includes a dependency graph which is a directed graph with nodes representing variables and directed edges representing information flow between the nodes.

12. The system as set forth in claim 11, wherein each variable in the information flow policy includes an associated security label designating a security level, with the security labels collectively forming a security lattice such that any pair of elements has a least upper bound and a greatest lower bound.

13. The system as set forth in claim 12, wherein each information flow policy includes declassification points, the declassification points specifying where information may flow freely between security levels.

14. The system as set forth in claim 13, wherein each information flow policy includes declassification conditions, the declassification conditions specifying conditions upon which a person is allowed to alter the declassification points.

15. The system as set forth in claim 14, further comprising executable instructions encoded on the memory for causing the one or more processors perform operations of:
a. determining if the changes in source code satisfy the information flow policy that was based on the earlier source code revision;
   i. if yes, then reporting that the first information flow policy is satisfied, then stopping; or
   ii. if no, adding a declassification point to the first information flow policy, then
b. determining if the changes in source code satisfy the first information flow policy as modified by the declassification point;
   i. if yes, then reporting that the first information flow policy is satisfied, then stopping; or
   ii. if no, then
c. relabeling the dependency graph; and
d. reporting the changes in the source code to a developer.

16. The system as set forth in claim 11, wherein in determining changes in source code between the earlier source code revision and a current source code revision, a difference is calculated by a number of changes in source code between the earlier source code revision and the current source code revision.

* * * * *